United States Patent [19]
Ogden et al.

[11] Patent Number: 5,347,847
[45] Date of Patent: Sep. 20, 1994

[54] TEST APPARATUS EMPLOYING PNEUMATIC BRIDGE FOR TESTING PNEUMATIC FLOW RESISTANCE AND RELATED METHODS

[75] Inventors: John E. Ogden; Peter L. Bryant, both of Libertyville; Lois L. Caron, McHenry, all of Ill.

[73] Assignee: Abbott Laboratories, Abbott Park, Ill.

[21] Appl. No.: 993,199

[22] Filed: Dec. 18, 1992

[51] Int. Cl.$^5$ .......................... G01F 1/36; G01B 13/00
[52] U.S. Cl. ........................................ 73/37; 73/37.5; 116/273; 222/71
[58] Field of Search .................. 116/273; 73/861, 37, 73/37.5, 861.52, 196; 222/71; 261/Dig. 27

[56] References Cited
U.S. PATENT DOCUMENTS

| | | | |
|---|---|---|---|
| 2,266,566 | 12/1941 | Poole | 73/30.5 |
| 3,082,619 | 3/1963 | Nerheim et al. | 73/30.03 |
| 3,091,113 | 5/1963 | Nerheim | 73/30.03 |
| 3,117,439 | 1/1964 | Nerheim | 73/30.03 |
| 4,550,592 | 11/1985 | Dechape | 73/37.5 |

Primary Examiner—Hezron E. Williams
Assistant Examiner—J. David Wiggins
Attorney, Agent, or Firm—A. Nicholas Trausch

[57] ABSTRACT

In an apparatus for testing pneumatic flow resistance of a test component, such as an air filter useful in a system for admixing parenteral solutions, a pneumatic bridge has two branches connected, via a filter, a flow restrictor, and a flowmeter, to a source of gas under regulated pressure. Each branch comprises two arms with a centerpoint. The bridge has a pressure transducer connected between the centerpoints and arranged to detect pressure imbalances in the bridge. Each arm comprises a flow restrictor, namely a needle valve, which is calibrated via a vernier head. The valves are adjustable to balance the bridge. In one arm, in which the needle valve can be fully opened, the test component is connectible to constitute a flow restrictor. The transducer produces an output displayed via a digital voltmeter, which may be calibrated.

10 Claims, 2 Drawing Sheets

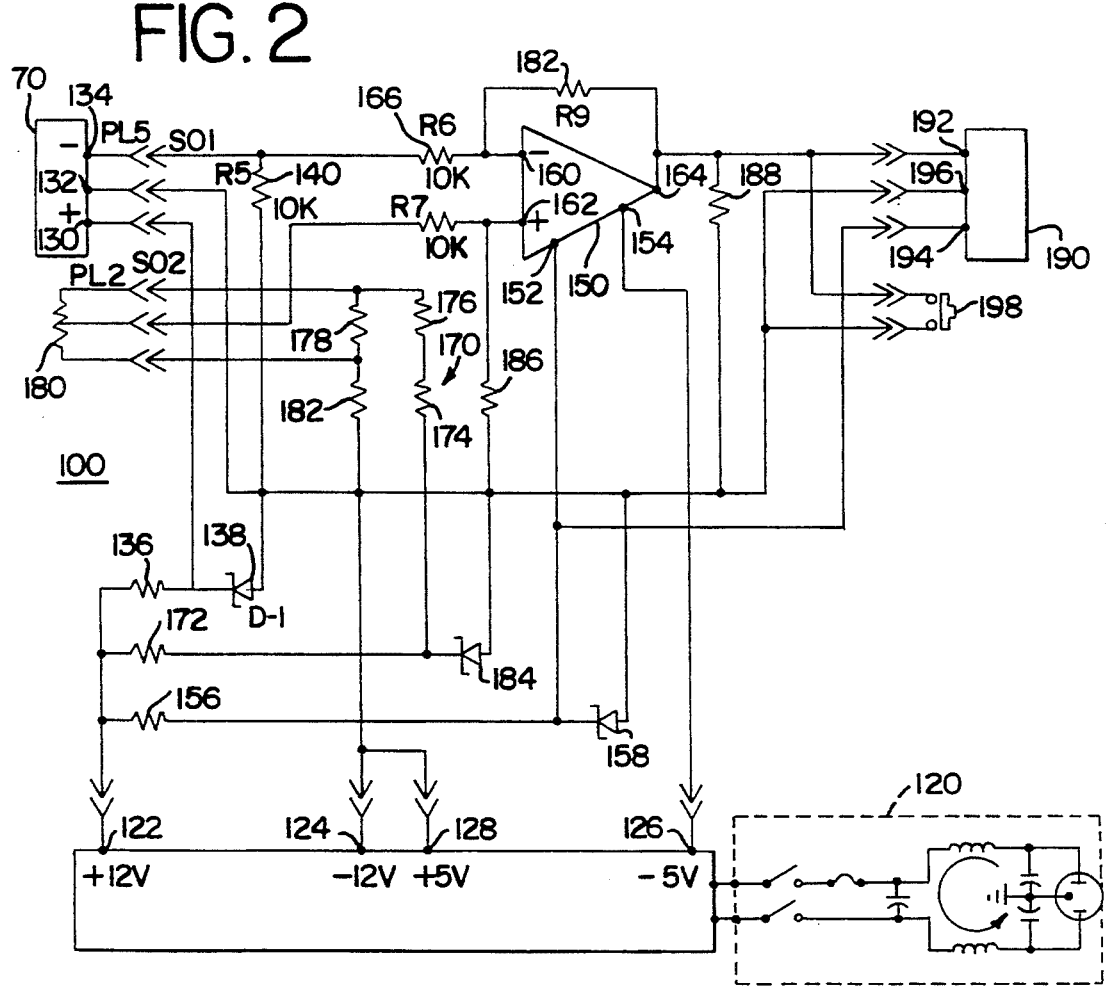
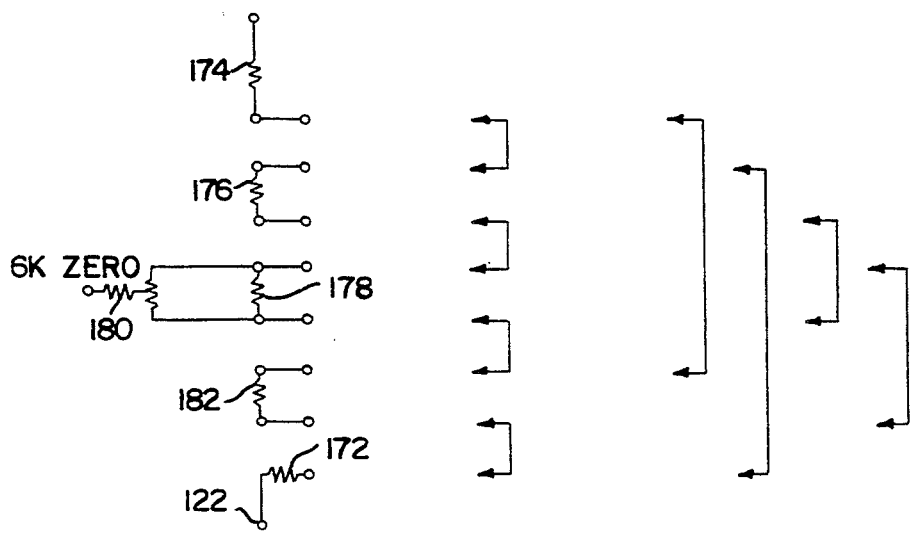

TEST APPARATUS EMPLOYING PNEUMATIC BRIDGE FOR TESTING PNEUMATIC FLOW RESISTANCE AND RELATED METHODS

TECHNICAL FIELD OF THE INVENTION

This invention pertains to an apparatus employing a pneumatic bridge for testing pneumatic flow resistance of a test component, such as an air filter useful in a system for admixing parenteral solutions, or a test component defining a liquid flow path. This invention also pertains to related testing methods employing a pneumatic bridge.

BACKGROUND OF THE INVENTION

In recently developed systems for admixing parenteral solutions, liquids are extracted in precisely controlled volumes from inverted bottles, into which ambient air is admitted through air filters to replace liquids being pumped from the bottles and to prevent partial vacuums from forming above liquids in the bottles. The air filters are used to remove potential contaminants from ambient air being admitted into the bottles. Other components of such systems include cassettes having positive displacement pumps for pumping liquids in precisely controlled volumes.

To enable liquids to be thus extracted in precisely controlled quantities from the bottles, pneumatic flow resistances of certain components including the air filters and hydraulic flow resistances of other components including the cassettes must be precisely known. It is a practical necessity, therefore, to test all or statistically valid samples of those components.

One method known heretofore for testing pneumatic flow resistance of an air filter made of a hydrophobic material is to wet one side of such a filter, to apply air pressure to the other side, and to measure the pressure required to form a bubble on the wetted side. The method tends not to have repeatable results and is not useful for testing air filters made of hydrophilic materials.

Methods using liquids for testing hydraulic flow resistances of cassettes noted above have been known heretofore but are regarded as destructive. It is not practical to use such a method to sort such cassettes by hydraulic flow resistance.

SUMMARY OF THE INVENTION

This invention provides an apparatus employing a pneumatic bridge for testing pneumatic flow resistance of a test component defining a flow path. Since hydraulic flow resistance and pneumatic flow resistance tend to correlate closely, the apparatus is useful not only with a test component defining a flow path for a gas, such as an air filter useful in a system for admixing parenteral solutions, but also with a test component defining a flow path for a liquid, such as a cassette noted above. The apparatus is expected to be also useful with test components of other similar and dissimilar kinds.

The pneumatic bridge has two branches. Each branch comprises two arms with a centerpoint between the arms. Each arm comprises at least one flow restrictor. The test component is connectable to one arm to constitute a flow restrictor. The bridge also has a pressure transducer connected between the centerpoints of the branches.

The transducer is arranged to detect pneumatic pressure imbalances in the bridge. Thus, the transducer can be advantageously used to detect whether a pneumatic pressure imbalance has been introduced when one test component is substituted for another, after pneumatic pressures in the bridge have been balanced.

Preferably, each branch has a high pressure end and a low pressure end, and the high pressure ends of the branches are connected to a common source of gas at a regulated pressure. Preferably, moreover, the test component is connected in the arm between the centerpoint of one branch and the low pressure end thereof. It is useful for the apparatus to employ a flowmeter arranged to measure the rate of flow of gas to the high pressure ends of the branches.

In one embodiment, one arm of one branch comprises an adjustable valve, which is openable to minimize its pneumatic flow resistance. The test component is connectible to such arm to constitute a flow restrictor. Preferably, each of the other flow restrictors in the contemplated arrangement is constituted by a similar valve.

A pneumatic bridge having an adjustable valve in one arm of one branch can be advantageously used in several different ways for testing pneumatic flow resistance of a test component defining a flow path.

Thus, the pneumatic bridge can be so used in one embodiment by: (1) equalizing pneumatic flow resistances in the arms other than the arm comprising the valve; (2) opening the valve; and (3) connecting the test component to the arm comprising the valve. Thereupon, if a calibrated valve in another arm of the bridge is adjusted to balance pneumatic pressures in the bridge, the pneumatic flow resistance of the test component may be then determined from the valve adjustment. Moreover, if the output of the pressure transducer is displayed, it may be then possible to determine the pneumatic flow resistance of the test component from the displayed output.

Also, if one arm comprises a flow restrictor defining a test standard, the pneumatic bridge is useful for testing pneumatic flow resistance of a test component by balancing pneumatic pressures in the bridge and substituting the test component for the flow restrictor defining the test standard.

These and other objects, features, and advantages of this invention are evident from the following description of a preferred embodiment of this invention with reference to the accompanying drawings.

BRIEF DESCRIPTION OF THE DRAWINGS

FIG. 2 is a diagram of an electronic circuit of the apparatus of FIG. 1.

FIGS. 3a, 3b, and 3c are diagrams of alternative connections among certain resistors of the circuit of FIG. 2.

DETAILED DESCRIPTION OF PREFERRED EMBODIMENT

Figure 1:
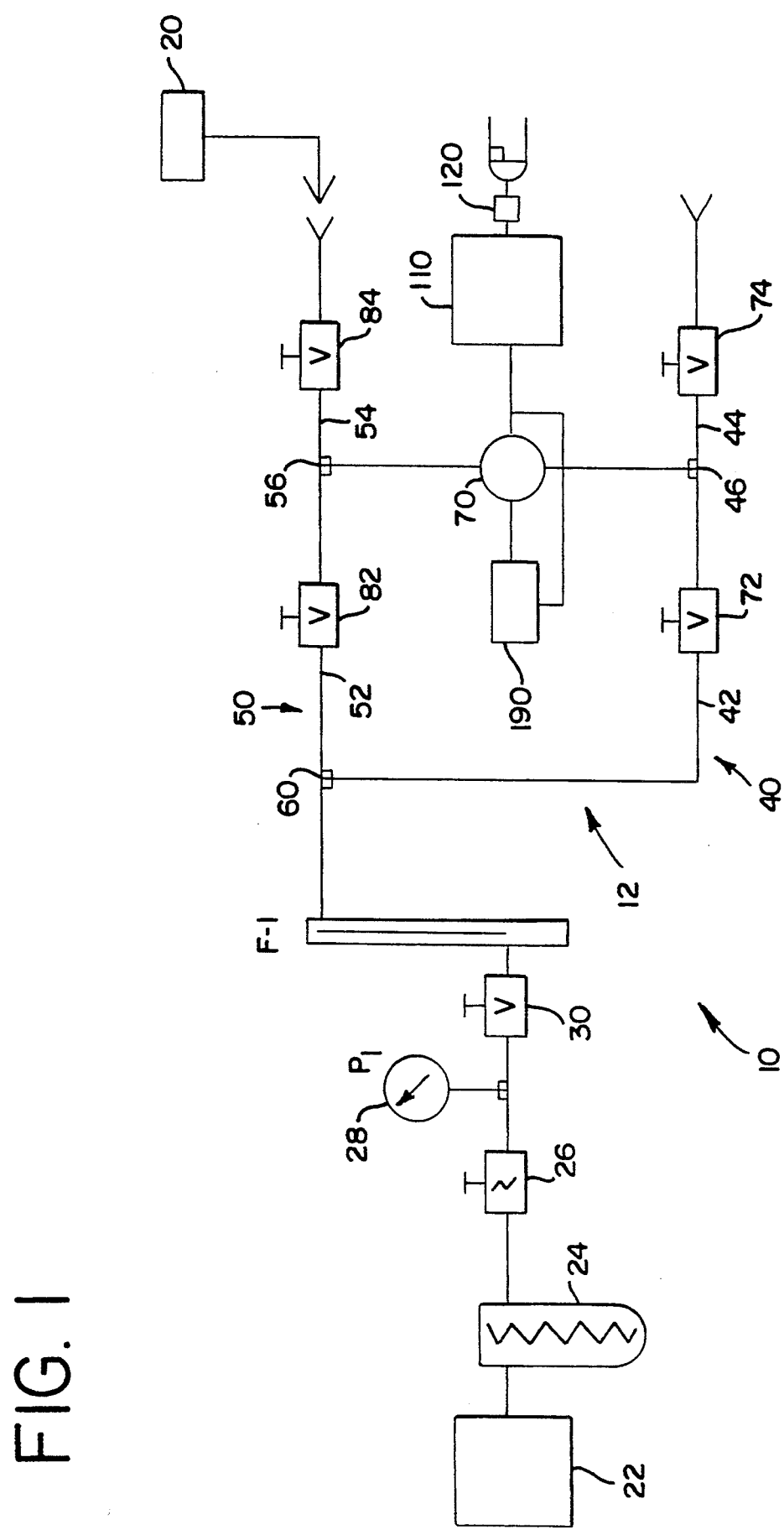
FIG. 1 is a pneumatic and electrical diagram of an apparatus constituting a preferred embodiment of this invention.

As shown in the drawings, an apparatus 10 employing a pneumatic bridge 12 for testing pneumatic flow resistance of a test component 20 defining a flow path for a gas or gases or defining a flow path for a liquid or liquids constitutes a preferred embodiment of this invention. The pneumatic bridge 12 is analogous to a Wheatstone bridge (not shown) comprising electrical resistors.

The apparatus 10 may be advantageously used if the test component 20 is an air filter made of a hydrophobic or hydrophilic material for use in a system for admixing parenteral solutions. Alternatively, since hydraulic flow resistance and pneumatic flow resistance tend to correlate closely, the test component 20 may be a cassette having a pump for pumping a liquid in precisely controlled volumes for use in such a system. This invention is not limited to a test component of any particular kind.

As shown in FIG. 1, the apparatus 10 is connected to a source 22 of pressurized gas, such as pressurized air or pressurized nitrogen. Pressurized nitrogen is preferred. The apparatus 10 comprises a filter 24, which is connected to receive the gas from the source 22 of pressurized gas, to remove any contaminants, such as oil or particulates, from the gas. A pressure regulator 26, which is connected to receive the gas from the filter 24, supplies the gas at a regulated pressure. A pressure gauge 28, which is connected to the pressure regulator 26, monitors the pressure of the gas supplied by the pressure regulator 26. A valve 30 constituting a flow restrictor is connected to the pressure regulator 26 to restrict gas flow from the pressure regulator 26. A flowmeter 32, which is connected to the valve 30, monitors gas flow from the valve 30. The valve 30 is a needle valve of a type that is adjustable via a vernier head. A needle valve having a vernier head and suitable for the needle valve 30 is available commercially from NUPRO Company of Willoughby, Ohio. A flowmeter suitable for the flowmeter 32 is available commercially from Gilmont Industries of Barrington, Illinois.

The bridge 12 has two branches, each having two arms, and each having a high pressure end and a low pressure end. Thus, a first branch 40 of the bridge 12 has a first arm 42 at its high pressure end and a second arm 44 at its low pressure end with a centerpoint 46 between the arms 42, 44. Also, a second branch 50 of the bridge 12 has a first arm 52 at its high pressure end and a second arm 54 at its low pressure end with a centerpoint 56 between the arms 52, 54. The high pressure ends of the branches 40, 50, are connected through a common junction 60 to receive the gas from the flowmeter 32. Except in certain circumstances explained below, the low pressure ends of the branches 40, 50, are vented to ambient air.

The bridge 12 also has a pressure transducer 70 connected between the centerpoints 46, 56, of the branches 40, 50. The transducer 70 is arranged to detect gas pressures above and below a reference pressure to detect pressure imbalances in the bridge 12. A pressure transducer suitable for the pressure transducer 70 is a Type 143PC01D pressure sensor available commercially from Micro Switch (Honeywell) of Freeport, Ill.

In the first branch 40 of the bridge 12, the first arm 42 comprises a valve 72 and the second arm 44 comprises a valve 74. In the second branch 50 of the bridge 12, the first arm 52 comprises a valve 82 and the second arm 54 comprises a valve 84. Each of the valves 72, 74, 82, 84, is a needle valve of a type that is adjustable via a vernier head. Needle valves having vernier heads and suitable for the needle valves 72, 74, 82, 84, are available commercially from NUPRO Company of Willoughby, Ohio.

Preferably, the valves 72, 74, 82, 84, are adjusted so that the pneumatic flow resistances of these valves are equal, whereby the bridge 12 should be pressure balanced. Alternatively, these valves are adjusted so that the ratio of the flow resistances of the valves 72, 82, of the first arms 42, 52, equals the ratio of the flow resistances of the valves 74, 84, of the second arms 44, 54, whereby the bridge 12 should be pressure balanced.

As diagrammed in FIG. 2 and discussed below, the apparatus 10 comprises an electronic circuit 100 for powering the pressure transducer 70 and for displaying the transducer outputs. Exemplary values are set forth parenthetically below for certain elements of the circuit 100 according to the preferred embodiment of this invention.

In the circuit 100, an input current (110–120 VAC, 60 Hz) is supplied to a direct current (DC) power supply 110 via an EMI filter 120 arranged to filter electromagnetic interference (EMI) from the input current. An EMI filter suitable for the filter 120 is a Series L power line filter available commercially from Corcom Inc. of Libertyville, Ill.

The power supply 110 is split to establish a positive voltage differential (12 V) between a high voltage pin 122 and a ground pin 124 and a negative voltage differential (5 V) between a low voltage pin 126 and a ground pin 128. The ground pins 124, 128, are shunted. A power supply suitable for the power supply 110 is Model SLD-12-1818-12 linear open frame DC power supply available commercially from Sola (General Signal) of Elk Grove Village, Ill.

The pressure transducer 70 has an input pin 130, an output pin 132, and a ground pin 134. The input pin 130 is connected to the high voltage pin of the power supply 110 via a resistor 136 (100 Ω). A zener diode 138 (8 V) is connected between the input pin 130 and the ground pin 134 so as to regulate the voltage at the input pin 130. The output pin 132 is connected to the ground pin 132 via a resistor 140 (10K Ω).

In the circuit 100, an operational amplifier 150 is provided, which is powered with positive (pin 152) and negative (pin 154) 5 volts with respect to common (128,124). The positive 5 voltage pin 152 is connected to the high voltage pin 122 of the power supply 110 via a resistor 156 (70 Ω). A zener diode 158 (5 V) is connected between the high voltage pin 152 and the ground pins 124, 128, of the power supply 110 so as to regulate the voltage at the positive 5 voltage pin 152. The negative 5 voltage pin 154 is connected to the low voltage pin 126 of the power supply 110.

The operational amplifier 150 has an inverting input pin 160, a noninverting input pin 162, and an output pin 164. The inverting input pin 160 is connected to the output pin 132 of the pressure transducer 70 via a resistor 166 (10K Ω). The noninverting input pin 162 is connected to a variable positive voltage supply via a resistive network 170. An operational amplifier suitable for the operational amplifier 150 is a Model LT1013 (dual precision) operational amplifier available commercially from Linear Technology Corp. of Milpitas, Cal.

Generally, the resistive network 170 is comprised of several resistors, which are connected via an arrangement of connecting straps. Specifically, the resistive network 170 is comprised of resistor 172 (150 ohm), resistor 174 (500 ohm), resistor 176 (500 ohm), resistor 178 (1k ohm), resistor (potentiometer) 180 (5k ohm), and resistor 182 (3k ohm). Resistor 174 has one end wired permanently to a regulated positive 5 volt supply formed by resistor 172 and zener diode 184. The network can be connected in two configurations by means of straps (FIGS. 3b and 3c). This allows the pentiometer 180 to be used to set the voltmeter (pressure) 190 appropriately for two choices of pressure transducer 70.

The potentiometer 180 supplys a voltage to the operational amplifier 150 which opposes and cancels the offset voltage (output at zero pressure) of the transducer 70 to give a zero reading on the voltmeter (pressure) 190. The switch 198 shorts the input terminals of the voltmeter 190 during calibration to establish its zero value.

In the circuit 100, a digital voltmeter 190 is provided, which has a positive 5 volt input pin 194 connected to the resistor 156 and zener diode 158, a signal input pin 192 connected to the output pin 164 of the operational amplifier 150, and a ground pin 196 connected to the ground pins 124, 128, of the power supply 110. A voltmeter suitable for the voltmeter 190 is a Model AP-201 Series digital panel meter available commercially from Triplett of Bluffton, Ohio. A normally open, push button, zero set switch 198 is connected between the low voltage input pin 192 and the ground pin 196.

In one application contemplated by this invention, the valves 72, 74, 82, are adjusted via their vernier heads to have equal pneumatic flow resistances. The test component 20 is connected to the arm 54 comprising the valve 84, which is opened fully to minimize its pneumatic flow resistance. If the pressure transducer 70 detects a pressure imbalance, which is displayed on the digital voltmeter 190, the valve 74 is readjusted to balance pneumatic pressures in the bridge 12. The pneumatic flow resistance of the valve 74, as readjusted, approximates the pneumatic flow resistance of the test component 20 and is determinable via a calibration curve or a subsequent measurement.

In the application noted above, if the pneumatic flow resistance of the test component 20 is close to the pneumatic flow resistance of each of the valves 72, 74, 82, the pneumatic flow resistance of the test component 20 can be directly read from the voltmeter 190, if the voltmeter 190 is calibrated suitably. If the digital panel meter noted above is used as the voltmeter 190, the voltmeter 190 has a nonlinear scale.

In another application contemplated by this invention, the valves 72, 74, 82, are adjusted to balance pneumatic pressures in the bridge 12 after a test component 20 having known pneumatic flow resistance and serving as a test standard has been connected to the arm 54 comprising the valve 84, and after the valve 84 has been opened fully to minimize its pneumatic flow resistance. As other test components are substituted successively for the test component 20 serving as the test standard, pneumatic pressure imbalances due to those test components are detected by the pressure transducer 70.

As mentioned above, the pressure transducer 70 is arranged to detect gas pressures above and below a reference pressure. In an alternative embodiment of this invention, it is possible to use a pressure sensor arranged to detect pressures above but not below a reference pressure, if the resistors of the resistive network 170 are rearranged suitably. A pressure transducer suitable for the alternative embodiment is a Type 142PC01D pressure sensor available commercially from Micro Switch (Honeywell) of Freeport, Ill.

In FIG. 3a, the resistors of the resistive network 170 are shown without connecting straps. In FIG. 3b, an arrangement of connecting straps for connecting such resistors to define the resistive network 170 suitable for the preferred embodiment is shown. In FIG. 3c, an arrangement of connecting straps for connecting such resistors to define a resistive network suitable for the alternative embodiment is shown.

Various other modifications may be made in the preferred embodiment described above without departing from the scope and spirit of this invention.

We claim:

1. An apparatus for testing pneumatic flow resistance of a test component, the apparatus comprising a pneumatic bridge having two branches, each branch comprising two arms with a centerpoint between the arms, each arm comprising at least one flow restrictor, the bridge having a pressure transducer connected between the centerpoints of the branches and arranged to detect pneumatic pressure imbalances in the bridge, wherein each branch has a high pressure end and a low pressure end, the high pressure ends of the branches being connected to a common source of gas at regulated pressure, the test component being connectible in the arm between the centerpoint of one branch and the low pressure end thereof.

2. The apparatus of claim 1 comprising a flowmeter arranged to measure the flow rate of gas flowing from the common source to the high pressure ends of the branches.

3. An apparatus for testing pneumatic flow resistance of a test component defining a flow path, the apparatus comprising a pneumatic bridge having two branches, each branch comprising two arms with a centerpoint between the arms, each arm comprising at least one flow restrictor, the bridge having a pressure transducer connected between the centerpoints of the branches and arranged to detect pneumatic pressure imbalances in the bridge, one arm comprising an adjustable valve, the valve being openable to minimize its pneumatic flow resistance and constituting one of the flow restrictors unless it is opened, the test component being connectible to the arm comprising the valve to constitute one of the flow restrictors.

4. The apparatus of claim 3 wherein each branch has a high pressure end and a low pressure end, the high pressure ends of the branches being connected to a common source of gas at regulated pressure.

5. The apparatus of claim 4 comprising a flowmeter arranged to measure the flow rate of gas flowing from the common source to the branches.

6. The apparatus of claim 5 wherein at least one of the flow restrictors not in the arm to which the test component is connectible is constituted by an adjustable valve, which is calibrated.

7. The apparatus of claim 5 wherein each of the flow restrictors except for the test component is constituted by an adjustable valve, which is calibrated.

8. A method for testing pneumatic flow resistance of a test component defining a flow path, the method employing a pneumatic bridge having two branches, each branch comprising two arms with a centerpoint between the arms, each arm comprising at least one flow restrictor, the bridge having a pressure transducer connected between the centerpoints of the branches and arranged to detect pneumatic pressure imbalances in the bridge, one arm comprising an adjustable valve constituting one of the flow restrictors, the valve being openable to minimize its pneumatic flow resistance, the method comprising the steps of equalizing pneumatic flow resistances of the flow restrictors in the arms other than the arm comprising the valve, opening the valve, and connecting the test component to the arm comprising the valve.

9. The method of claim 8 wherein one of the flow restrictors of another of the arms is constituted by an adjustable valve, which is calibrated, and wherein the method further comprises the steps of adjusting the calibrated valve to balance pneumatic pressures in the bridge and determining the pneumatic flow resistance of the test component from the valve adjustment.

10. The method of claim 8 further comprising the steps of displaying the output of the pressure transducer and determining pneumatic flow resistance of the test component from the displayed output.

* * * * *